US012656221B2

(12) United States Patent (10) Patent No.: US 12,656,221 B2

Stammler (45) Date of Patent: Jun. 16, 2026

(54) SYSTEM AND METHOD FOR THERMAL MONITORING OF A LARGE ROLLING BEARING

(71) Applicant: Fraunhofer-Gesellschaft zur Förderung der angewandten Forschung e.V., Munich (DE)

(72) Inventor: Matthias Stammler, Bremerhaven (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 374 days.

(21) Appl. No.: 18/258,153

(22) PCT Filed: Dec. 16, 2021

(86) PCT No.: PCT/EP2021/086350
§ 371 (c)(1),
(2) Date: Jun. 16, 2023

(87) PCT Pub. No.: WO2022/129440
PCT Pub. Date: Jun. 23, 2022

(65) Prior Publication Data
US 2024/0053227 A1 Feb. 15, 2024

(30) Foreign Application Priority Data
Dec. 17, 2020 (DE) ..................... 10 2020 216 210.7

(51) Int. Cl.
*G01K 13/08* (2006.01)
*G01M 13/04* (2019.01)
*G01N 25/00* (2006.01)

(52) U.S. Cl.
CPC ............. *G01M 13/04* (2013.01); *G01K 13/08* (2013.01); *G01N 25/00* (2013.01); *F16C 2233/00* (2013.01); *F16C 2360/31* (2013.01)

(58) Field of Classification Search
None
See application file for complete search history.

(56) References Cited

U.S. PATENT DOCUMENTS

| | | | |
|---|---|---|---|
| 2008/0094231 A1* | 4/2008 | Hohn | ........................ G01K 7/42 |
| | | | 374/100 |
| 2015/0247529 A1* | 9/2015 | Klos | ..................... F16C 19/522 |
| | | | 374/46 |
| 2016/0069775 A1 | 3/2016 | Thomson | |

FOREIGN PATENT DOCUMENTS

| | | |
|---|---|---|
| DE | 69329623 T2 | 6/1994 |
| EP | 1703137 A2 | 9/2006 |
| EP | 2927662 B1 | 8/2017 |

OTHER PUBLICATIONS

International Search Report and Written Opinion issued in PCT/EP2021/086350, mailed Apr. 20, 2022.
Translation of International Search Report issued in PCT/EP2021/086350, mailed Apr. 20, 2022.

* cited by examiner

*Primary Examiner* — Erica S Lin

(74) *Attorney, Agent, or Firm* — Nelson Mullins Riley & Scarborough LLP

(57) ABSTRACT

A system for monitoring a rolling element bearing including the rolling element bearing (1) and at least three temperature sensors. The at least three temperature sensors include a first temperature sensor (2) positioned in the environment of the rolling element bearing (1) to detect an environmental temperature; a second temperature sensor (3) positioned at a highly loaded region (9) of the rolling element bearing (1), preferably adjacent to a rolling surface of the rolling element bearing (1), to detect a load temperature; and a third temperature sensor (4) positioned at a less loaded or unloaded region (10) of the rolling element bearing (1), preferably adjacent to a rolling surface of the rolling element bearing (1), to detect an idling temperature. The system includes an evaluation device (5) that is configured to evaluate the state of the rolling element bearing (1) based on detected temperatures.

20 Claims, 6 Drawing Sheets

SYSTEM AND METHOD FOR THERMAL MONITORING OF A LARGE ROLLING BEARING

CROSS REFERENCED TO RELATED APPLICATIONS

This application is a national stage entry of PCT/EP2021/086350, internationally filed on Dec. 16, 2021, which claims priority to German Application No. 10 2020 216 210.7, filed Dec. 17, 2020, both of which are incorporated herein by reference in their entirety.

TECHNICAL FIELD

The invention relates to a system for the thermal monitoring of large rolling element bearings to recognize damage to the rolling element bearings in an early and reliable manner. A wind turbine that comprises such a system and a method of operating a rolling element bearing, preferably a rolling element bearing in a wind turbine, are further described.

BACKGROUND

Large rolling element bearings such as are used, for example, in wind turbines, but also in drills, cranes, and other industrial construction machinery, are mechanically highly loaded components. They are therefore produced with very high quality demands and have correspondingly long service lives. Damage can nevertheless occur in operation, in particular at the raceways of the inner and outer races on which the rolling element bearings roll off. Whereas smaller damage can initially be tolerated, it typically increases in further operation so that the running properties of the rolling element bearing are influenced very negatively and ultimately a replacement of the bearing is necessary to also avoid consequential damage. Such a repair is in particular complex and expensive with wind turbines while additional costs arise due to an unplanned downtime of the plant. It is therefore sensible to recognize possible damage at an early point to take suitable measures such as a replacement or interventions in the operational management to relieve the rolling element bearing.

Such early damage recognition as a rule takes place via the measurement of the drive torques with smaller rolling element bearings. With large rolling element bearings, however, the torque measurement has to be designed for high torques due to the high friction torques while the relative changes of the torque due to damage are initially very small, which would make damage recognition very difficult. Other methods for early damage recognition in rolling element bearings are based on a monitoring of vibrations, noise development, or deformation of the bearing races. However, these methods are technically complex and require high measurement frequencies and expensive sensors.

A further possibility of recognizing damage to a rolling element bearing is the monitoring of the temperature of the bearing. Damage, to the rolling surface of the bearing for example, always results in increased friction in the affected region and thus also in a temperature increase. A method of monitoring the state of a rolling element bearing of a wind turbine is proposed in EP 2 927 662 B1 that is based on standardizing the temperature of the rolling element bearing by a comparison with the temperature in the nacelle of a wind turbine and evaluating differences in this standardized temperature to recognize damage. However, this method is highly dependent on the position of the temperature measurement points and is accordingly unreliable.

SUMMARY

It is therefore an object of the present subject matter of the invention to propose a system that can be technically simply implemented and that enables reliable early damage recognition at large rolling element bearings based on temperature measurements.

This object is achieved by a system in accordance with independent claim 1. A wind turbine that comprises such a system is described in claim 7 and a method of operating such a wind turbine is described in claim 12. Further advantageous embodiments result from the dependent claims.

A system for monitoring a rolling element bearing comprises the rolling element bearing;

at least three temperature sensors, wherein a first temperature sensor is positioned in the environment of the rolling element bearing to detect an environmental temperature;

a second temperature sensor is positioned at a highly loaded region of the rolling element bearing, preferably adjacent to a rolling surface of the rolling element bearing, to detect a load temperature; and a third temperature sensor is positioned at a less loaded or unloaded region of the rolling element bearing, preferably adjacent to a rolling surface of the rolling element bearing, to detect an idling temperature; and an evaluation device that is configured to evaluate the state of the rolling element bearing based on the detected environmental temperature, load temperature, and idling temperature.

The load of a rolling element bearing is typically not evenly distributed over its total circumference, whereby specific temperature distributions result on which damage can exert a great influence. It therefore suitable to distribute a plurality of temperature sensors along the circumference of the rolling element bearing to detect this temperature distribution. Two sensors are at least necessary for this purpose in regions of the rolling element bearing of differing levels of load as well as a temperature sensor in the environment of the rolling element bearing that makes it possible to standardize the detected temperatures with respect to external influences.

A rolling element bearing consists of an outer race, a rolling element, and an inner race. The rolling element here rolls on the rolling surfaces at the inner side of the outer race and on the outer side of the inner race. These rolling surfaces are in this respect particularly susceptible to damage and the temperature sensors should therefore be placed as close to them as possible. Rolling element bearings are adapted to take up radial forces uniformly and to keep the friction between the inner and outer races as small as possible. In addition, large rolling element bearings as a rule, however, also take up bending moments so that regions of the rolling element bearing are subjected to different levels of load. A highly loaded region of the rolling element bearing is in particular caused by the effect of high forces on the rolling element. Such a force acts, for example, by the mass of a heavy shaft or, in wind turbines, due to aerodynamic forces that act on rotor blades that are fastened at rotor blade bearings. Increased friction of the rolling element on the rolling surfaces in this region of the rolling element bearing is caused by these additional forces as a rule. Considerably lower forces act on the rolling element outside these highly loaded regions. The forces act unevenly over the rolling element overall so that highly loaded and less loaded regions can be distinguished. With static forces such as the effective inert forces of a shaft or of a rotor blade, the forces can be determined in advance and thus the locations at which the sensors should be arranged can likewise be determined in advance. With dynamic forces such as the forces acting on the rotor blades due to the wind, a determination can likewise be made based on the prevailing wind conditions (for example by means of simulations or test stages) on the regions on which increased loads are to be anticipated.

A first temperature sensor is positioned in the environment of the rolling element bearing. This environment is thermally coupled to the rolling element bearing; a temperature change in the environment due to external influences therefore also has an effect on the temperature distribution at the rolling element bearing. In the case of a rolling element bearing in a wind turbine, the environment of a rolling element bearing could, for example, be within the nacelle that accommodates the rolling element bearing. For other large machinery, the environment can be defined as the assembly of the rolling element bearing. It is important in the positioning of the first temperature sensor that a thermal coupling of the environment of the rolling element bearing with the rolling element bearing is present, that is the positions of the first temperature sensor and of the rolling element bearing have a similar temperature behavior.

A second temperature sensor detects a load temperature in a highly loaded region of the rolling element bearing. The position of the second temperature sensor is therefore selected in dependence on the use of the rolling element bearing such that an increased radial or axial force acts on the rolling element bearing at this position. Due to the additional load and to the greater friction that results therefrom, the load temperature will as a rule be higher in comparison with the environmental temperature and the idling temperature.

A third temperature sensor detects an idling temperature in a less loaded region or an unloaded region of the rolling element bearing. The position of the third temperature sensor therefore has to be selected in dependence on the use of the rolling element bearing such that no increased radial or axial forces act on the rolling element bearing at this position. The use of the term idling here, however, should not necessarily mean that the rolling element bearing is free of forces at this position, but that the effective forces are negligible in comparison with a position in a highly loaded region. Due to the smaller load and to the weaker friction that results therefrom, the idling temperature will as a rule be lower in comparison with the environmental temperature and the load temperature.

The temperature distribution along the circumference of the rolling element bearing can be detected more exactly by the use of further temperature sensors. They can be distributed at equal intervals along the circumference for this purpose or can also be associated with respective regions of different loads.

The at least three detected temperatures form the basis of the evaluation of the evaluation device. A temperature increase in the load temperature or idling temperature is a sign of increased friction in the rolling element bearing and is an indication of damage. The detection of an environmental temperature makes it possible to recognize damage independently of environmental conditions. Since the temperature increase is dependent on the load, the detection of a load temperature in a highly loaded region and of an idling temperature in a less loaded region of the rolling element bearing makes it possible to already detect a slight deviation. The difference of the load temperature and the idling temperature can, for example, be formed for this purpose and can be standardized with the environmental temperature to obtain a temperature difference between a highly loaded and a less loaded region independent of the environment. It can be compared with a known temperature difference for a rolling element bearing working without disruption that was detected, for example, for the same rolling element bearing or a rolling element bearing of the same kind on a test stage. Further possible sources for reference values are moreover simulations or empirical values from similar plants. If there is a deviation between the detected temperature difference and the reference value of a rolling element bearing working without disruption outside a fixed interval, this is interpreted as an indication of damage. On a detection of a plurality of temperatures at a plurality of measurement points, a comparison of these temperature values with reference values that were measured at the same measurement points appears suitable to obtain a detailed image of the change of the temperature distribution. However, various differences or ratios can also be formed therefrom. In its simplest form, a comparison of the detected temperatures against the temperatures to be expected of a rolling element bearing working without error takes place. If the detected temperatures are higher than those to be expected, this can be interpreted as an indication of damage to the rolling element bearing. To obtain the reference values, use can be made of the operating history of the rolling element bearing since on a correct installation of the bearing it can be assumed that it is undamaged at least at the start of its operation. To enable the comparison between the reference values and detected temperatures, a database for the reference values appears suitable whose design enables different embodiments.

The evaluation device can be configured to transmit an alarm signal when its evaluation of the state of the rolling element bearing indicates damage. The evaluation device can in particular be configured such that it only transmits an alarm signal after a multiple measurements of a deviation indicating damage to avoid a false alarm. The alarm signal can be transmitted in wired form or by radio. It can be a data signal with extensive information on the situation or a simple signal to instigate an optical or acoustic warning.

In addition to the detected temperatures, the evaluation device can also obtain further data that describe the operating state of the rolling element bearing. These data can be detected by sensors or by different components of the overall device of which the rolling element bearing is also a component. The operating state can be given by at least one of the following parameters: load applied to the rolling element bearing, service life, speed and/or lubrication state of the rolling element bearing. The detected temperatures or the differences or relationships formed therefrom can now be associated with an operating state described in this manner. The evaluation unit can comprise a database in which reference values of the temperatures, differences, or relationships for an operating state are stored. These reference values can be practically determined, estimated or calculated values.

If the database does not yet contain any reference values or only a few reference values for an operating state, the evaluation device can be configured to store the differences or ratios formed by the detected temperatures or formed from them as new reference values. The database can be completed in this manner and further comparisons can be carried out with a statistically relevant number of measured values. A first time period of the operating history of the rolling element bearing is in particular suitable to detect reference values since it can be assumed that the rolling element bearing is undamaged after a correct assembly and can be operated without disruption and first damage only arises after a longer load.

The database can moreover include the information how often an operating state has already been detected. On the comparison of the detected temperatures with the reference values, they can be weighted by the number of measurements of the detected operating state. The relevance of a detected deviation can thus be better evaluated.

The described system for monitoring a rolling element bearing is in particular suitable to monitor rolling element bearings in a wind turbine.

If the system is used in a wind turbine in an embodiment, in which the operating state is detected and is compared with a database, the time of year and day, the precipitation, and wind speed, as well as the power produced by the plant are further parameters to describe the operating state of the rolling element bearing. These parameters are relevant because they may have an influence on the temperature and the load on a rolling element bearing in a wind turbine.

Provision can in particular be made to statistically evaluate the detected temperatures for specific time intervals such as days, weeks, or months so that standard parameters for specific operating states result for these intervals with respect to which deviations can be easily determined. However, it must naturally be known for this purpose that the monitored rolling element bearing had worked without disruptions by damage in the examined time interval. A first time period after the putting into operation of the wind turbine can in turn serve as a source for error-free reference values.

The system of a wind turbine can furthermore be configured such that the database does not only contain its own reference values, but also reference values of other wind turbines, for example of further plants in the same wind farm. They are here preferably reference wind turbines that are exposed to similar conditions, stand at similar positions in the wind farm, for example. These wind turbines can have a common database for this purpose.

In addition, when the monitored rolling element bearing is a rotor blade bearing that connects the rotor hub to a rotor blade, further rotor blade bearings at the same wind turbine can also serve as a source for reference values for a comparison.

A method of monitoring a rolling element bearing in a wind turbine comprises the following steps:

detecting a plurality of temperatures, at least one being
        an environmental temperature in an environment of the rolling element bearing;
        a load temperature at a highly loaded region of the rolling element bearing, preferably adjacent to a rolling surface of the rolling element bearing;
        an idling temperature at a less loaded or unloaded region of the rolling element bearing, preferably adjacent to a rolling surface of the rolling element bearing; and
    evaluating the state of the rolling element bearing based on the detected temperatures.

The method can additionally comprise the steps of associating the detected temperatures with an operating state that at least comprises at least one of the parameters of applied load, operating time, speed, and/or lubrication state, and of comparing the detected temperatures with reference values stored in a database for the operating state to improve the evaluation.

An alarm signal can be transmitted in an additional step in one or more evaluations of the state of the rolling element bearing that indicate damage to the rolling element bearing.

The detected operating state can here in turn comprise the time of year and day, the precipitation, and wind speed, as well as the power produced by the plant.

The method can moreover comprise the detected temperatures with respect to a detected operating state lacking reference values being stored as new reference values.

The method can additionally prescribe that the stored reference values are weighted by the number of measurements of the detected operating state to be able to evaluate the relevance of a detected deviation.

The described embodiments of the subject matters of the present application can here be used both individually and in combination to achieve additional effects and thus to provide a simple, but reliable system and method for thermal monitoring of large rolling element bearings and a wind turbine utilizing them.

BRIEF DESCRIPTION OF THE DRAWINGS

The mentioned aspects as well as further aspects of the invention will become visible with reference to the detailed description of the embodiments that will be provided with the aid of the following drawings, of which.

The claimed subject matters will be explained in more detail in the following on the basis of the accompanying drawings. In this respect, the same reference numerals relate to the same elements.

DETAILED DESCRIPTION

Figure 1:
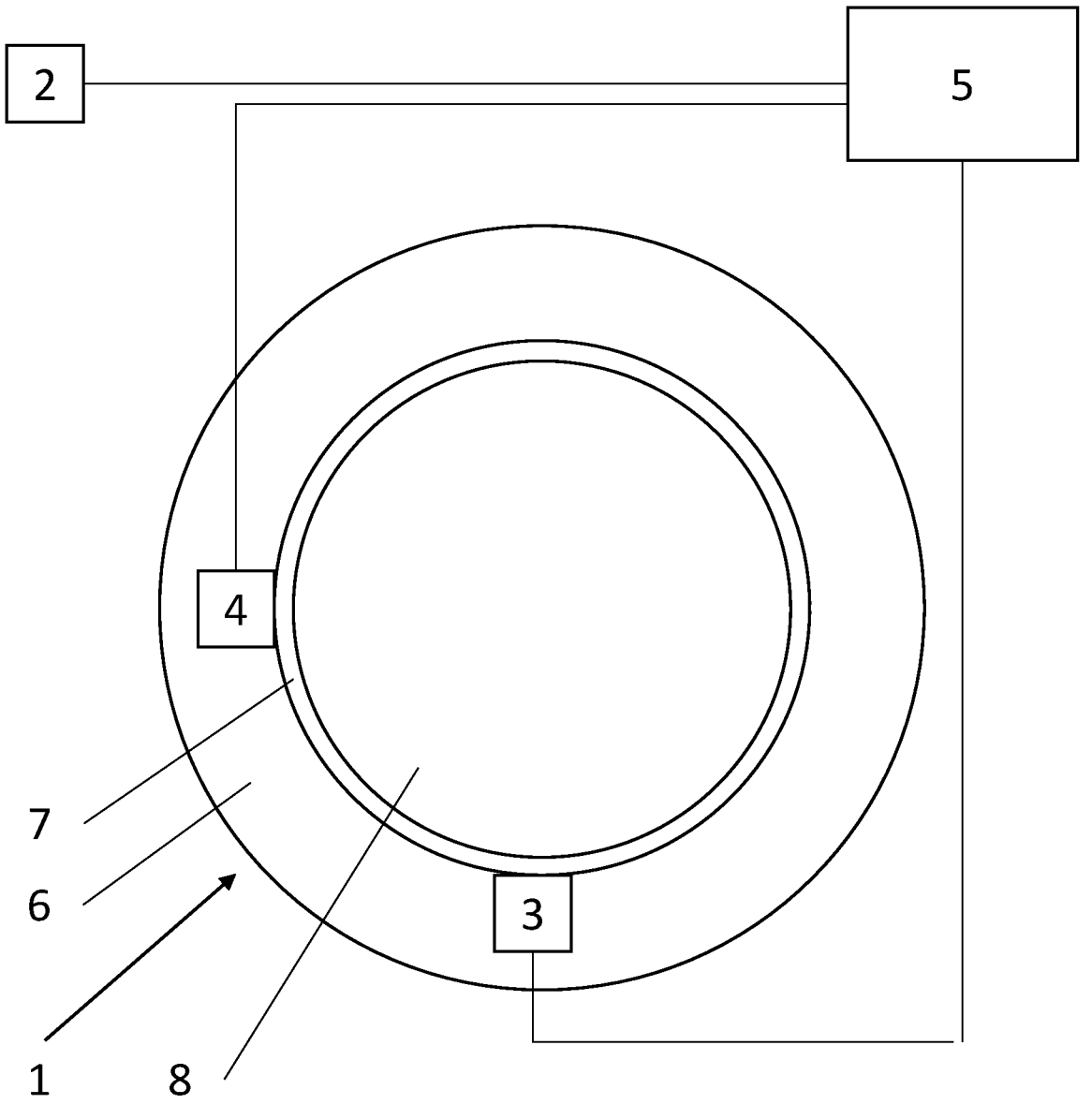
FIG. 1 is a schematic representation of a system for monitoring a rolling element bearing.

A system for monitoring a rolling element bearing using three temperature sensors is schematically shown in FIG. 1. The representation here has been kept simplified to make the relevant components visible. The rolling element bearing 1 consists of an outer race 6 and an inner race 8. A rolling element 7 is disposed therebetween that should represent different embodiments of rolling elements such as balls, cylinders, cones, needles, and similar in abstract form. A first temperature sensor 2 is located in the environment of the rolling element bearing that is thermally coupled thereto. A second temperature sensor 3 and a third temperature sensor 4 are applied in the outer race 6 of the rolling element bearing 1 and are located adjacent to or in the inner rolling surface of the outer race on which the rolling element 7 rolls off. However, the second and third temperature sensors do not have to be located in the outer race; embodiments with two sensors at the rolling surface of the inner race are also conceivable. The second temperature sensor 3 is located in a highly loaded region of the rolling element bearing, the third temperature sensor 4 in a less loaded region. The positions of the temperature sensors have been selected for this representation such that the Figure remains clear, but the formation of the different load regions is looked at in more detail in the description with respect to FIG. 3*a* and FIG. 3*b*.

The three temperature sensors 2, 3, 4 are connected to an evaluation device 5. It can in this respect be a programmable logic controller, a processor, or a specialized circuit. It can also be a network of more different units that is configured to evaluate the state of the rolling element bearing based on the detected temperatures. To evaluate the state, the difference is formed from the detected load temperature, detected by the second temperature sensor (3), and the idling temperature, detected by the third temperature sensor (4), and is put into relationship with the environmental temperature, detected by the first temperature sensor (2). If this value differs from the values already measured in defect-free operation, this may be an indication of damage to the rolling element bearing.

A used algorithm can be adapted to compare the detected temperatures with temperatures stored as reference values and to be expected in disruption-free operation. The temperatures used as reference values can originate from tests and simulations of rolling element bearings of the same design, but they can also be acquired from the operating history of the rolling element bearing in that it is assumed that it had no damage at least in a time period at the start of its operation in which the temperatures were measured. If the detected temperatures are higher than the reference values, if in particular a larger temperature increase is present in a highly loaded region than in a less loaded region, this may be evaluated as an indication of damage to the rolling element bearing 1. A plurality of such evaluations may be necessary before a final evaluation on the state of the rolling element bearing is made to increase the reliability of the evaluation.

In an advantageous embodiment, the evaluation device comprises a database. It includes reference values for the environmental temperature, the load temperature and the idling temperature for different operating states of the rolling element bearing. The operating states comprise information on the load, operating time, speed, and lubrication state of the bearing. If the database for an operating state does not yet contain any reference temperatures, the detected temperatures can be stored. How many measurements of an operating state there have been in the past can equally be detected to perform a weighting of the stored reference values with this number. The relevance of a deviation can be evaluated in this manner.

In this embodiment, the detected temperatures are only compared with reference values for comparable operating states by the evaluation device, with deviations, in particular temperature increases of the detected temperatures, being able to be interpreted as an indication of damage to the rolling element bearing.

The evaluation device 5 can be connected to further components (not shown) to obtain information on the operating state from them or to transmit an alarm signal to them if the evaluation shows that the rolling element bearing has been damaged.

Figure 2:
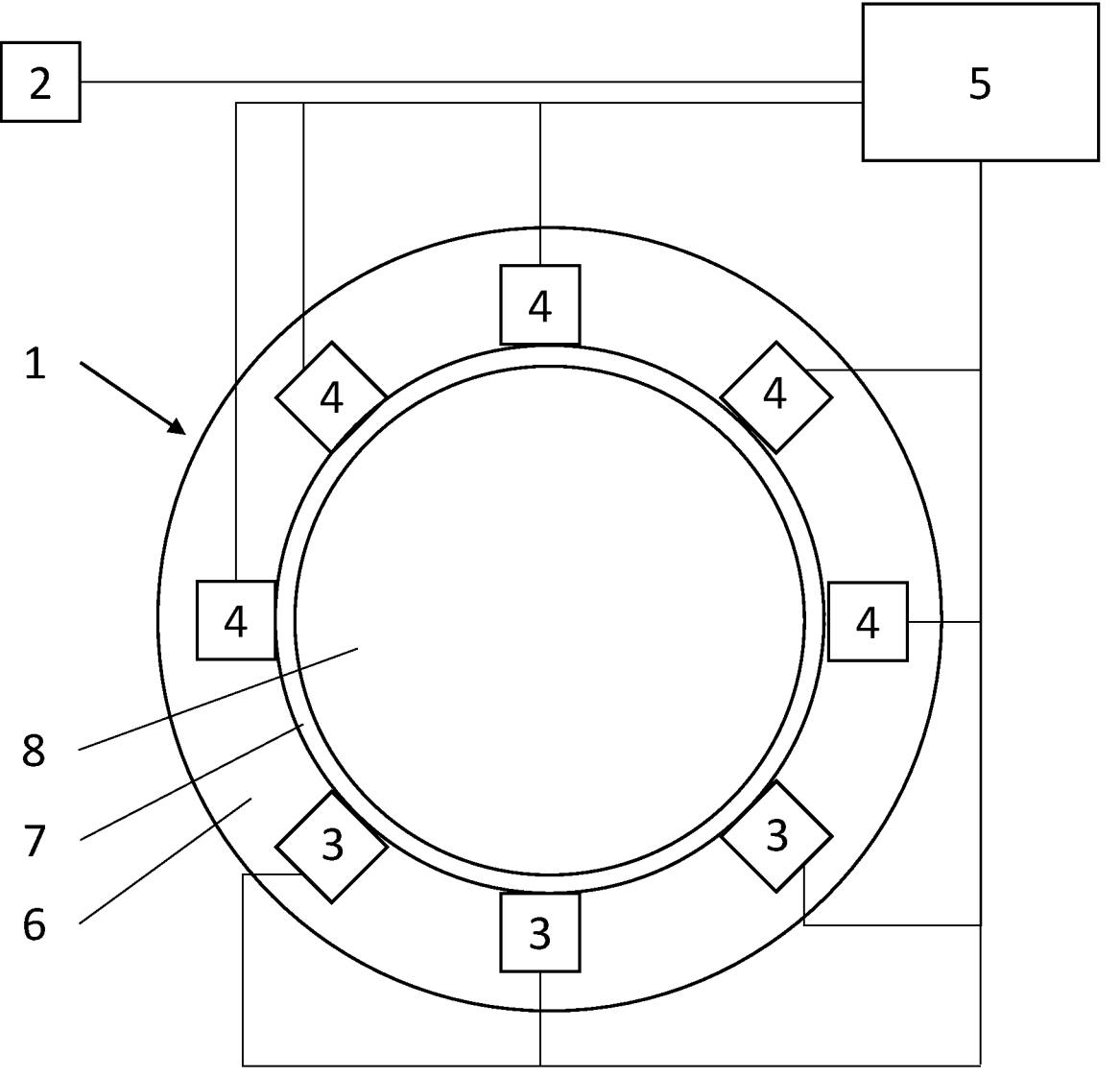
FIG. 2 is a schematic representation of a system for monitoring a rolling element bearing with further temperature sensors.

FIG. 1 shows an embodiment having exactly three temperature sensors, but embodiments having further temperature sensors are also possible in which the temperature of additional regions of the rolling element bearing of different loads are detected. Such an embodiment is shown in FIG. 2. Eight temperature sensors are distributed at uniform intervals around the circumference of the rolling element bearing here. Since the rolling element bearing 1 experiences the same load as in FIG. 1, second temperature sensors 3 in a heavily loaded region and third temperature sensors 4 in a less loaded region are here also divided. However, temperature distributions within these regions can also be detected by the use of further sensors, for example because the highest point load is applied at the center of a loaded region in each case. On a comparison with reference values, changes in the temperature distribution can thus be determined with greater accuracy. For this purpose, the database in this embodiment contains additional reference values for the measurement points of the further temperature sensors.

Figure 3A:
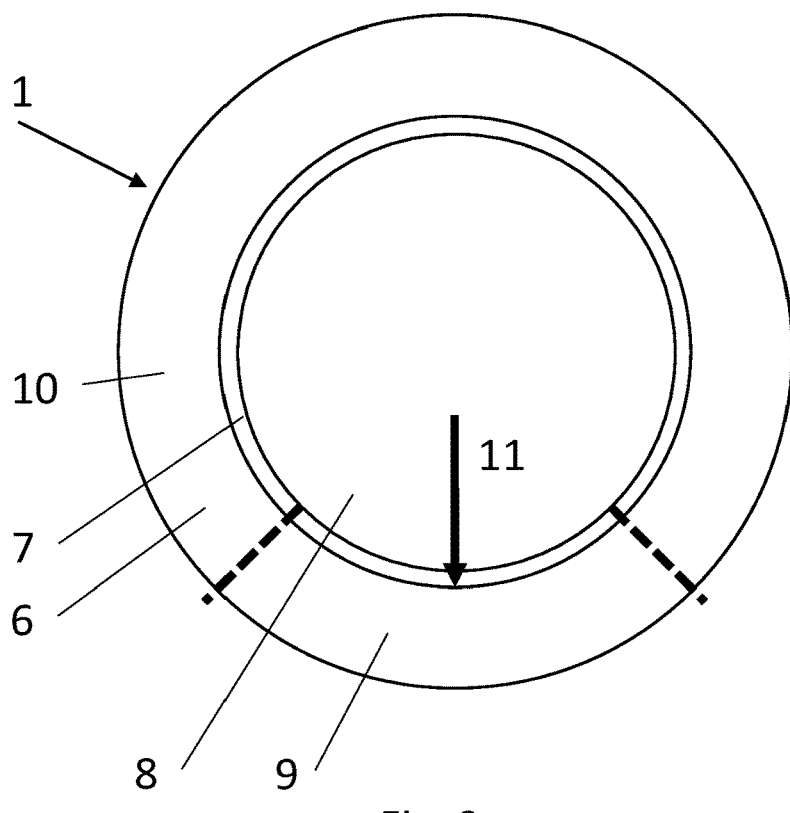
FIG. 3a and FIG. 3b represent the regions of different loads of a rolling element bearing under different forces.
Figure 3B:
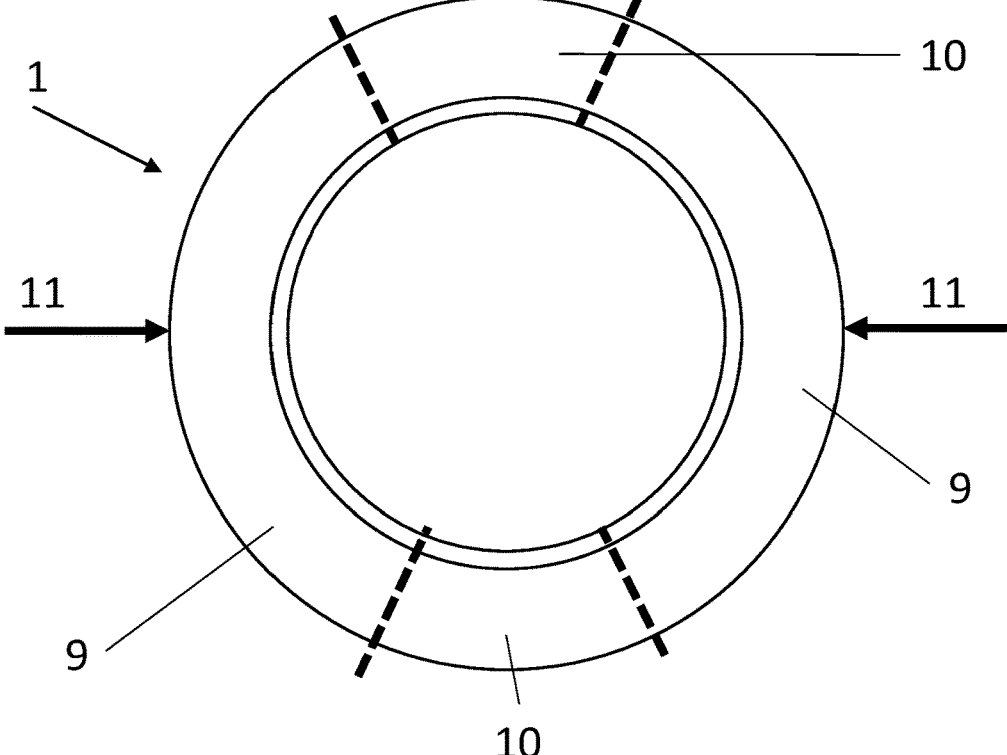

To represent the influence of different bending moments that a rolling element bearing can take up, two different cases are shown in FIG. 3*a* and FIG. 3*b*. FIG. 3*a* shows a rolling element bearing 1 on which a force 11 acts perpendicularly downwardly. This force can, for example, be the weight force of a drive shaft that is supported by the rolling element bearing. The rolling element 7 in the lower region 9, marked by the dashed lines, is loaded more by this force than in the region 10. It must be noted that the transition between the highly loaded region 9 and the less loaded or unloaded region 10 is naturally not discrete, but rather gradual in reality. A position in the highly loaded region 9 is suitable to measure a load temperature; a position in the less loaded region 10 is in contrast suitable to measure an idling temperature.

FIG. 3*b* shows a case such as could occur, for example, in a wind turbine in a rolling element bearing that serves as a rotor blade bearing for connecting the rotor hub to the rotor blades. In this case, a rotor blade would be fastened to the rolling element bearing so that it would project out of the plane of the image. Due to the wind, bending moments act on the rotor blade, which it forwards to the bearing. The direction of these forces is shown by the arrows 11; however, they do not necessarily have to act simultaneously. Difference forces act on different regions of the rolling element bearing depending on the state of the rotor blades and in accordance with aerodynamic conditions. Highly loaded regions 9 and less loaded regions 10 thereby result averaged over time. A position in one of the highly loaded regions 9 is suitable to measure a load temperature; a position in one of the less loaded regions 10 is in contrast suitable to measure an idling temperature.

The temperature increase due to increased friction at damage to the rolling element bearing depends on the load. The comparison of the load temperature that is detected in the highly loaded region 9 with the idling temperature that is detected in the less loaded or unloaded region 10 therefore makes it possible to also register small deviations and thus to obtain indications of damage at an early time.

Figure 4:
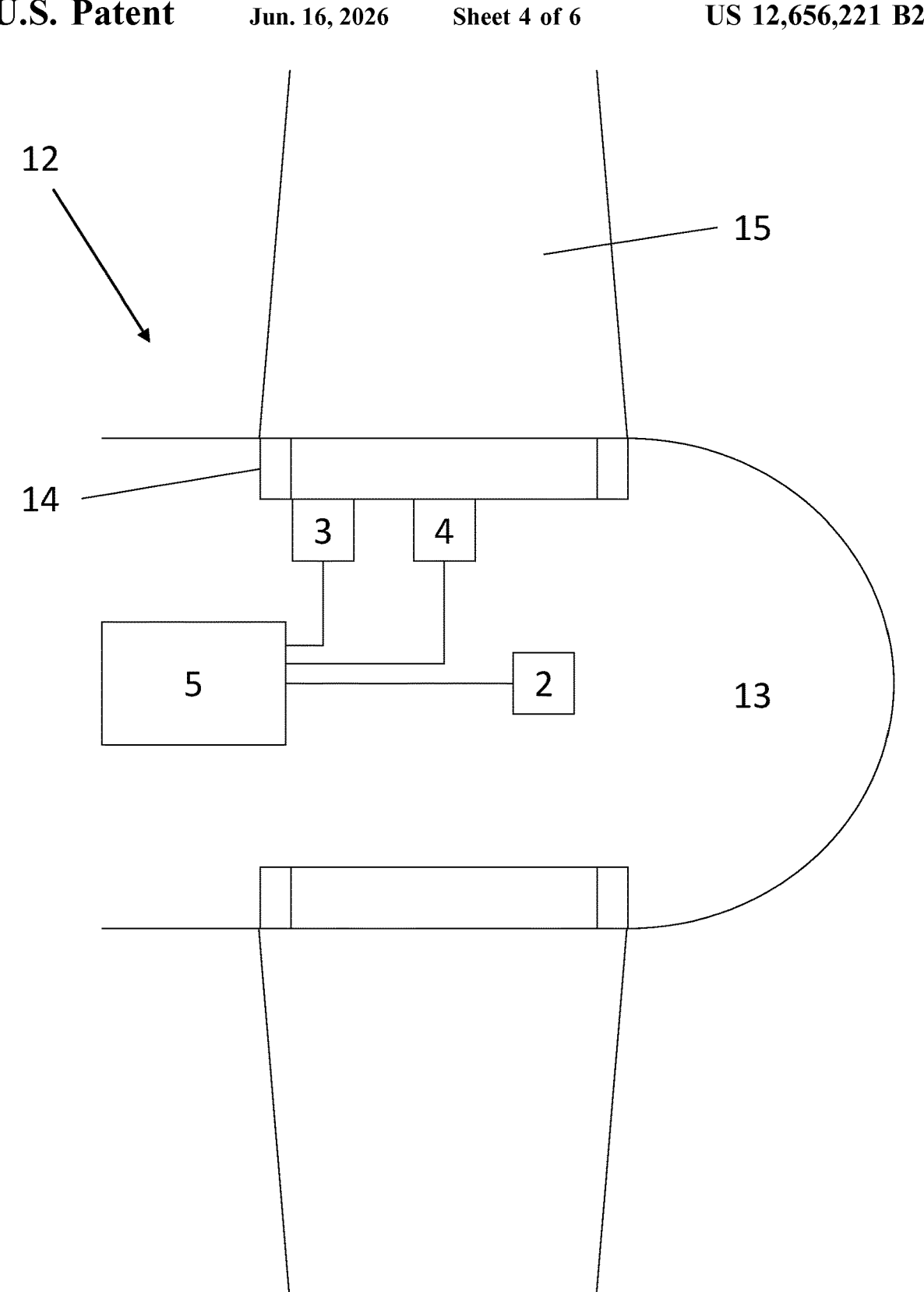
FIG. 4 is a schematic representation of the monitoring of a rotor blade bearing in a wind turbine.
Figure 5:
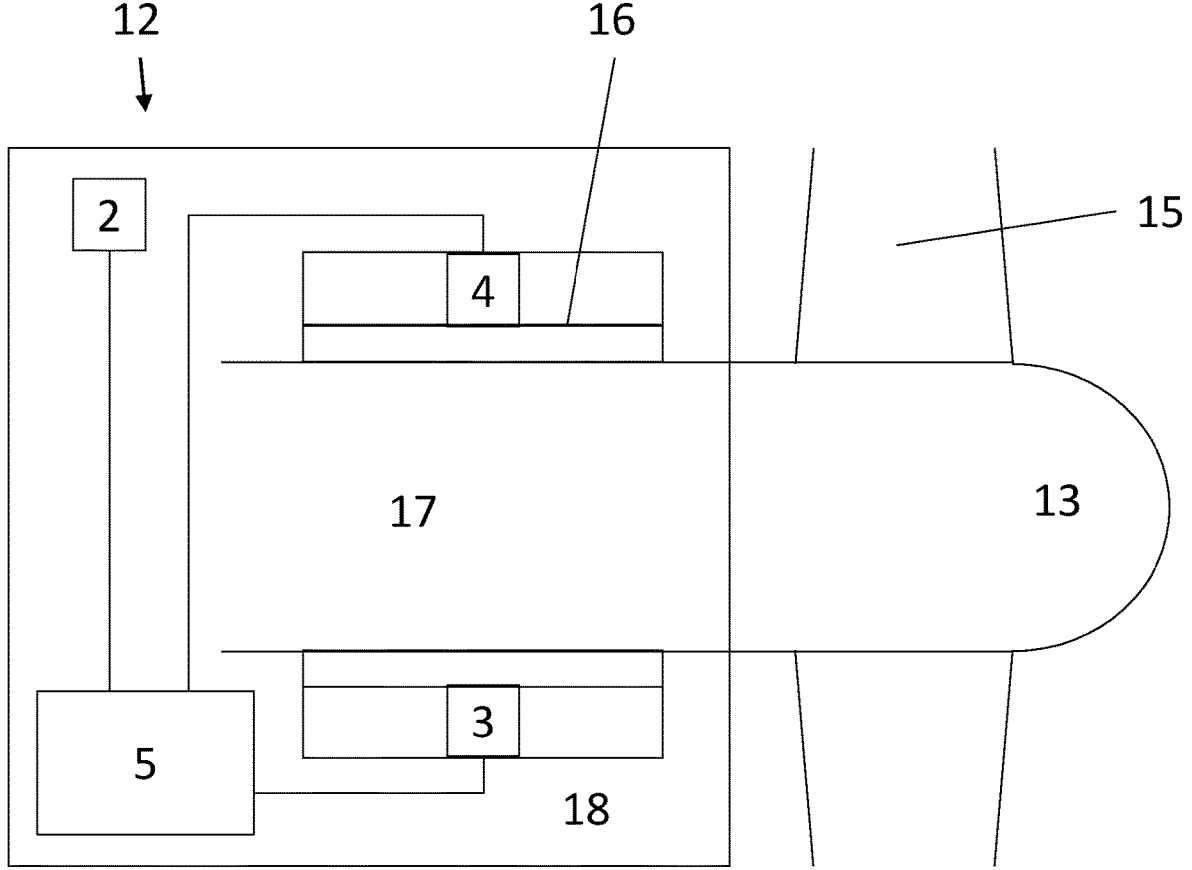
FIG. 5 is a schematic representation of the monitoring of a main bearing in a wind turbine.

The system for monitoring a rolling element bearing is particularly suitable for use in wind turbines. Examples for such a use are shown in FIG. 4 and FIG. 5. There are additional parameters in a wind turbine that may have an influence on the temperature and load of a rolling element bearing and are therefore part of the operating state to be detected. They include the time of year and day, the precipitation, and wind speed, as well as the power produced by the generator of the wind turbine. In addition, it is in particular sensible with a wind turbine to statistically evaluate the detected temperatures over a longer time period to exclude fluctuations due to environmental influences.

How the system for monitoring a rotor bearing 14 is used in a wind turbine 12 is shown in FIG. 4. The rotor blade bearing 14 is a rolling element bearing such as already described with respect to FIG. 1 that serves to connect the rotor blade 15 to the rotor hub 13 and that simultaneously enables a rotation of the rotor blade 15. Such bearings are, on the one hand, exposed to high loads due to the aerodynamic forces acting on the rotor blades; on the other hand, only small movements are actuated via these bearings as a rule so that these loads act on regions of the rolling element bearing in a very localized manner.

The rotor blade bearing 14 in FIG. 4 is provided with a second temperature sensor 3 and a third temperature sensor 4 that respectively measure the temperature in a highly loaded region and in a less loaded region (see FIG. 3b). A first temperature sensor 2 measures the temperature in a region uninfluenced by the bearing. The representation of the positions of the sensors is here only schematic to make the image clear. The actual position of the temperature sensors 3 and 4 would be in a plane with the rotor blade bearing 14 and the first temperature sensor 2 does not necessarily have to be in the rotor hub.

As indicated in FIG. 4, one rotor hub carries a plurality of rotor blades. If all the rotor blade bearings 14 of the wind turbine 12 are equipped with a system for monitoring, the possibility results of storing the detected temperatures of the rotor bearings 14 as reference values for the other rotor bearings. This is sensible since very similar conditions apply to the rotor blade bearings 14 at a rotor hub and the damage to a rotor blade bearing 14 can thus be easily recognized in comparison with the other bearings.

How the system for monitoring a main bearing is used in a wind turbine is shown in FIG. 5. The main bearing 16 is a rolling element bearing such as already described with respect to FIG. 1 that carries a shaft 17. The shaft 17 connects the rotor hub to a generator (not shown) in a nacelle 18. The main bearing 16 is provided with a second temperature sensor 3 and a third temperature sensor 4 that respectively measure the temperature in a highly loaded region and in a less loaded region (see FIG. 3a). A first temperature sensor 2 measures the temperature in a region of the nacelle 18 uninfluenced by the bearing.

To obtain additional reference values for the comparison of the temperatures, the measured values of further rolling element bearings (both of main bearings 16 and of the rotor blade bearing 14) of other wind turbines 12 can be used. These measured values should here have been produced under similar conditions. Wind turbines that stand in similar positions in the same wind farm are therefore particularly suitable. A differing temperature behavior of a rolling element bearing due to damage can thus in turn be easily detected.

Figure 6:
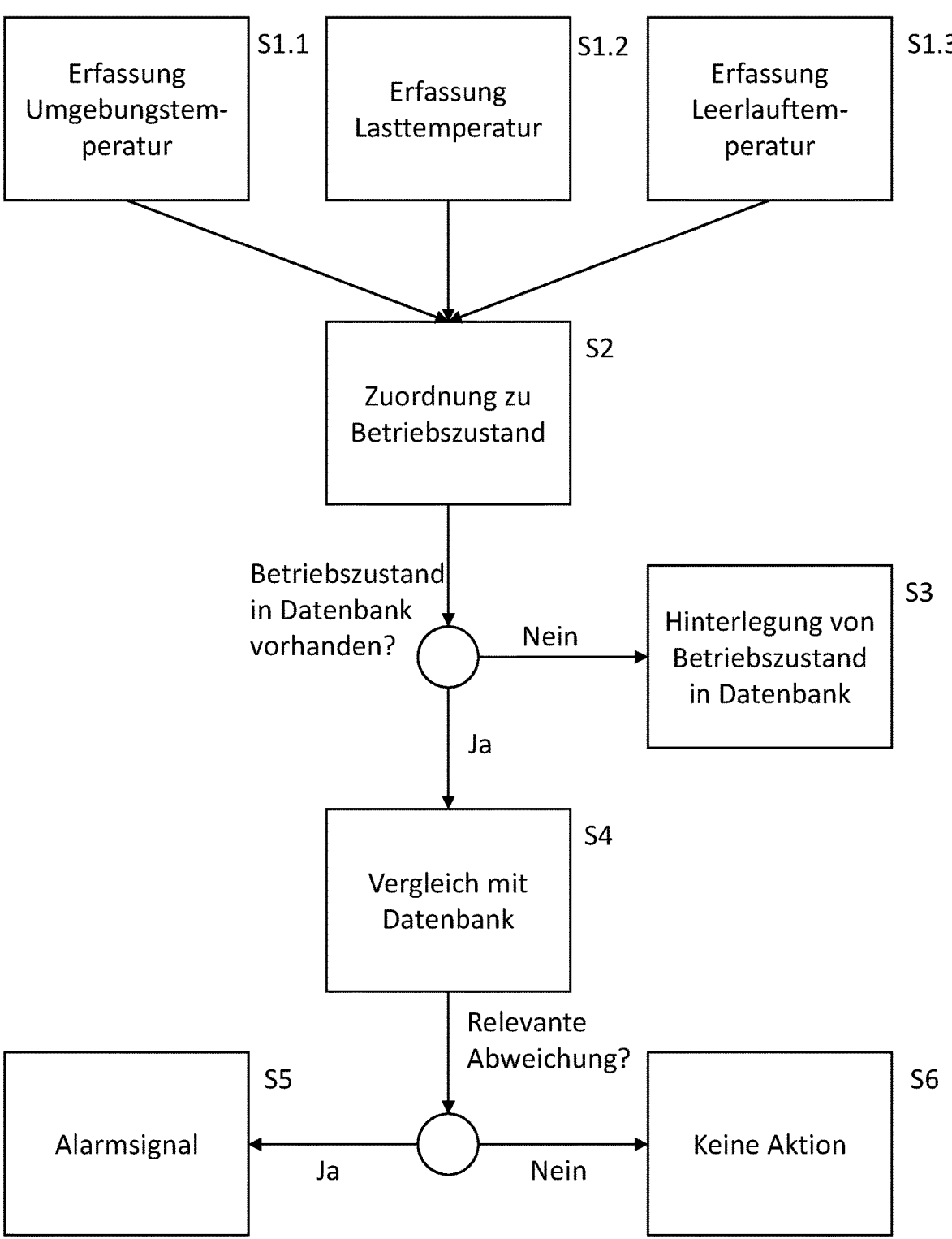
FIG. 6 shows a flowchart of the method of monitoring a rolling element bearing in a wind turbine.

FIG. 6 is a flowchart that summarizes the method of monitoring a rolling element bearing in a wind turbine. In a first step S1, the environmental temperature, load temperature, and idling temperature are detected, respectively at a position suitable for it, as already described.

In a second step S2, these temperatures are associated with an operating state that may additionally contain information on the load, operating time, speed, lubrication state, time of day and year, wind speed, precipitation, and generated power.

If no reference temperatures have yet been stored for this operating state, the detected temperatures are stored as reference temperatures in step S3 to allow comparisons for later measurements.

If there are reference temperatures for the operating state, the method is continued in step S4 in which the detected temperatures are compared with reference values stored in the database. In this respect, different algorithms can be used; the reference values with respect to an operating state can in particular be weighted with the number of measurements of this state so that deviations in well-known operating states have less weight in the evaluation than operating states in which the measured values have large uncertainties due to a small number of measurements.

If a deviation of the detected temperatures from the reference values evaluated as relevant is registered, an alarm signal S5 is transmitted. The method may also require this deviation to be confirmed in a plurality of measurements to ensure a reliable evaluation of the state of the rolling element bearing.

If, in contrast, no deviation is registered or if an existing difference is not evaluated as relevant, no need for action is present. The method can thereupon be repeated continuously or at regular time intervals. The method in this way makes possible a simple and reliable monitoring of a rolling element bearing in a wind turbine.

The embodiments shown here are not restrictive. In particular, the features of these embodiments may be combined with one another to achieve additional effects. It is clear for a person skilled in the art that changes to these embodiments may be carried out without leaving the basic principles of the subject matter of this protection application, whose scope is defined in the claims.

The invention claimed is:

1. A system for monitoring a rolling element bearing, the system comprising:

the rolling element bearing, at least three temperature sensors, wherein a first temperature sensor is positioned in the environment of the rolling element bearing to detect an environmental temperature;

a second temperature sensor is positioned at a highly loaded region along a circumference of the rolling element bearing, adjacent to a rolling surface of the rolling element bearing, to detect a load temperature; and a third temperature sensor is positioned at a less loaded or unloaded region along the circumference of the rolling element bearing, adjacent to a rolling surface of the rolling element bearing, to detect an idling temperature; and an evaluation device that is configured to evaluate the state of the rolling element bearing based on detected temperatures.

2. A system in accordance with claim 1, characterized in that the highly loaded region of the rolling element bearing at which the load temperature is detected is a region in which a rolling element experiences high forces.

3. A system in accordance with claim 1, characterized in that the evaluation device is additionally configured to transmit an alarm signal if one or more evaluations of the state of the rolling element bearing indicate damage to the rolling element bearing.

4. A system in accordance with claim 1, characterized in that the evaluation device additionally detects an operating state of the rolling element bearing comprising at least one parameter from applied load, operating time, speed, and/or lubrication state; and in that the evaluation device comprises a database in which reference values are stored for a comparison with the environmental temperature, load temperature, and idling temperature for different operating states of the rolling element bearing.

5. A system in accordance with claim 4, characterized in that the evaluation device is configured to store the detected temperatures as reference values in operating states for which no reference values have yet been stored in the database.

6. A system in accordance with claim 5, characterized in that the reference values of the database are weighted with a number of measurements in a specific operating state.

7. A system in accordance with claim 1, further comprising:

a fourth temperature sensor positioned at the highly loaded region of the rolling element bearing, adjacent to the rolling surface of the rolling element bearing, to detect a load temperature; and a fifth temperature sensor positioned at the less loaded or unloaded region of the rolling element bearing, adjacent to the rolling surface of the rolling element bearing, to detect an idling temperature.

8. A system in accordance with claim 7, further comprising:

a sixth temperature sensor positioned at the highly loaded region of the rolling element bearing, adjacent to the rolling surface of the rolling element bearing, to detect a load temperature;

a seventh temperature sensor positioned at the less loaded or unloaded region of the rolling element bearing, adjacent to the rolling surface of the rolling element bearing, to detect an idling temperature; and an eighth temperature sensor positioned at the less loaded or unloaded region of the rolling element bearing, adjacent to the rolling surface of the rolling element bearing, to detect an idling temperature.

9. A wind turbine, comprising:

at least one rotor blade;

at least one rotor hub;

at least one rolling element bearing; and at least one system for monitoring the at least one rolling element bearing;

wherein the at least one system for monitoring the at least one rolling element bearing includes:

a first temperature sensor is positioned in the environment of the at least one rolling element bearing to detect an environmental temperature;

a second temperature sensor is positioned at a highly loaded region along a circumference of the at least one rolling element bearing, adjacent to a rolling surface of the at least one rolling element bearing, to detect a load temperature; and a third temperature sensor is positioned at a less loaded or unloaded region along the circumference of the at least one rolling element bearing, adjacent to a rolling surface of the at least one rolling element bearing, to detect an idling temperature; and an evaluation device that is configured to evaluate the state of the at least one rolling element bearing based on detected environmental temperatures, detected load temperatures, and detected idling temperatures.

10. A wind turbine in accordance with claim 9, characterized in that the evaluation device is configured to detect an operating state of the at least one rolling element bearing comprising at least one of the following properties: wind speed, time of year, time of day, precipitation, and generated power.

11. A wind turbine in accordance claim 9, characterized in that the evaluation device is configured to statistically evaluate the detected environmental temperatures, detected load temperatures, or detected idling temperatures for specific time intervals.

12. A wind turbine in accordance with claim 9, characterized in that the evaluation device is configured to evaluate the state of the at least one rolling element bearing based on a comparison of the detected environmental temperatures, detected load temperatures, and detected idling temperatures with reference values that are detected in at least one reference wind turbine under similar conditions.

13. A wind turbine in accordance with claim 9, characterized in that the at least one rolling element bearing is a rotor blade bearing and the evaluation device is configured to compare the state of the rotor blade bearing based on a comparison of the detected environmental temperatures, detected load temperatures, and detected idling temperatures with reference values that are detected at at least one other rotor blade bearing of the same wind turbine.

14. A wind turbine in accordance with claim 9, wherein the at least one rolling element bearing is a main bearing.

15. A wind turbine in accordance with claim 9, further comprising:

a fourth temperature sensor positioned at the highly loaded region of the at least one rolling element bearing, adjacent to the rolling surface of the at least one rolling element bearing, to detect a load temperature; and a fifth temperature sensor positioned at the less loaded or unloaded region of the at least one rolling element bearing, adjacent to the rolling surface of the at least one rolling element bearing, to detect an idling temperature.

16. A method of monitoring a rolling element bearing of a wind turbine, the method comprising the steps:

detecting a plurality of temperatures, at least one being an environmental temperature in an environment of the rolling element bearing;

a load temperature at a highly loaded region along a circumference of the rolling element bearing, adjacent to a rolling surface of the rolling element bearing;

an idling temperature at a less loaded or unloaded region along the circumference of the rolling element bearing, adjacent to a rolling surface of the rolling element bearing; and evaluating the state of the rolling element bearing based on the detected temperatures.

17. A method in accordance with claim 16, additionally comprising the steps:

associating the detected temperatures with an operating state that at least comprises at least one parameter from applied load, operating time, speed, lubrication state, wind speed, time of year, time of day, precipitation, and generated power; and comparing the detected temperatures with at least one reference value stored in a database for the operating state.

18. A method in accordance with claim 16, additionally comprising the step:

transmitting an alarm signal on one or more evaluations of the state that indicate damage to the rolling element bearing.

19. A method in accordance with claim 17, characterized in that if no reference values have yet been stored in the database for an operating state, the detected temperatures for this operating state are stored as reference values.

20. A method in accordance with claim 17, characterized in that the at least one reference value stored in the database is weighted with a number of measurements in a specific operating state.

* * * * *